United States Patent

Stone, Jr.

[15] 3,701,190

[45] Oct. 31, 1972

[54] APPARATUS FOR AND THE METHOD OF COMPACTING AN IRREGULARLY SHAPED ARTICLE

[72] Inventor: Hilton F. Stone, Jr., Glastonbury, Conn.

[73] Assignee: United Aircraft Corporation, East Hartford, Conn.

[22] Filed: April 7, 1971

[21] Appl. No.: 131,968

[52] U.S. Cl. ..................................29/156.8, 72/63
[51] Int. Cl. ........................................B21k 3/04
[58] Field of Search ....29/156.8 B, 156.8 A, 156.8 P, 29/156.8 T; 72/63; 264/319

[56] References Cited

UNITED STATES PATENTS

| | | |
|---|---|---|
| 2,581,193 | 1/1952 | Le Compte ...........29/156.8 B |
| 2,738,571 | 3/1956 | Turnbull ..............29/156.8 B |
| 3,309,294 | 3/1967 | Goodwin..............29/156.8 B |
| 3,621,700 | 11/1971 | Wachtell...............29/156.8 B |

*Primary Examiner*—Charles W. Lanham
*Assistant Examiner*—James W. Davie
*Attorney*—Charles A. Warren

[57] ABSTRACT

An apparatus for use in and a method of compacting an article such as a fan or compressor blade made up of plies of a composite of high strength fibers in a metallic matrix with heat applied during the compacting in which a fluid pressure is applied to the article during the heating to assure a complete compaction and a removal of any voids in the article.

5 Claims, 2 Drawing Figures

PATENTED OCT 31 1972 3,701,190

INVENTOR
HILTON F. STONE, JR.
Charles Allen
BY ATTORNEY 3,701,190

APPARATUS FOR AND THE METHOD OF COMPACTING AN IRREGULARLY SHAPED ARTICLE

BACKGROUND OF THE INVENTION

The present invention relates to an apparatus for use in and a method of compacting a composite article such as a fan or compressor blade.

Cooperating bonding dies have been used for the purpose of making such articles as composite blades for fans or compressors. To obtain the desired thickness of blade, the dies are brought together as determined by stops between the dies but there is no way of establishing the amount of pressure applied to the article in a die assemblage of this character. Thus, the desired amount of compaction may not be reached or may even, in certain instances, be exceeded.

SUMMARY OF THE INVENTION

One feature of the invention is an apparatus by which to apply a fluid pressure to one side of the article while in the die cavity thereby exerting a selected uniform pressure over the entire surface for a uniform compacting of the fibers and matrix making up the article. Another feature is a method for compacting the several plies of composite material with a uniform pressure over the entire surface to produce a uniformly compacted finished article.

According to the invention, the cooperating dies or punch and die have cooperating shaped surfaces to establish between them an article cavity conforming to the shape of the finished article. When an article is positioned therein, fluid pressure is applied to the article as by the use of a flexible membrane overlying one die while heat is applied to the article to soften the matrix. The fluid pressure gives a uniform pressure over the entire article thereby eliminating any voids therein.

DESCRIPTION OF THE PREFERRED EMBODIMENT

Figure 1:
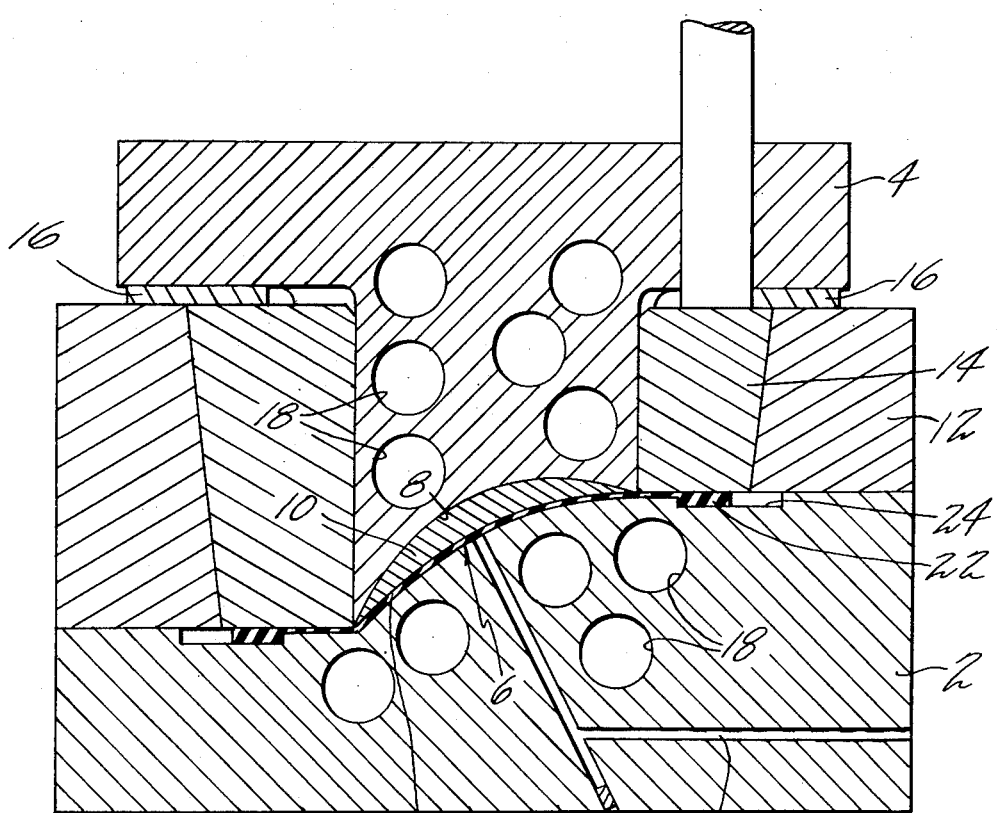
FIG. 1 is a sectional view through apparatus embodying the invention.

Referring to FIG. 1 the apparatus includes two dies, 2 and 4, the former being mounted on a base not shown and the latter, also referred to as a punch, carried by a moveable tool head, also not shown, by which to move the die 4 into and out of the operative position shown and to hold the dies in the operative position shown during the bonding operation. The dies have cooperating shaped surfaced 6 and 8, airfoil-shape in the arrangement shown, between which an article, also airfoil in shape, is positioned to be compacted and bonded. The cooperating surfaces 6 and 8 establish the finished configuration of the article and are adapted to operate as shown on an irregularly shaped surface such as the airfoil.

The punch or die 4 may be precisely located with relation to the die 2 in the operative position by a retaining ring 12 positioned on and secured to the die 2, with a plurality of wedge blocks 14 moved downwardly with the die 4 into a position between the die and ring. Stops 16 limit the approach of the dies toward one another so the cavity receiving the article is precisely the desired configuration. The dies have passages 18 therein to receive suitable heating elements by which to heat the dies and thereby heat the article during compaction and bonding thereof.

Although the article is shown to be of a homogeneous cross section, the apparatus was developed primarily to provide a uniform pressure to an airfoil-shaped blade for a fan or compressor made up of a plurality of stacked plies of a composite, these plies varying in width and length to produce the desired blade thickness. Blades of this character are described and claimed in the copending application of Gray, et al, Ser. No. 864,021 filed Oct. 6, 1969, now U.S. Pat. No. 3,600,103 having the same assignee as this application.

For this purpose of this invention, each ply may be made up of a plurality of parallely arranged high strength fibers such as boron filaments held together by a metallic matrix such as an aluminum alloy. After these plies are stacked as required to produce the desired finished thickness for the article and the stacked plies are positioned between the dies, the matrix is caused to flow to fill all the voids in the finished article and the matrix and fibers are all bonded together by the pressure and heat applied.

In order to assure the desired pressure on the article being compacted and bonded, a fluid pressure is applied to one side of the article positioned between the dies. To accomplish this, one of the dies, the bottom die 2 as shown, has a flexible membrane 20 overlying the surface 6 and extending beyond said surface in all directions so that the edges thereof are positioned under the wedge blocks 14 which are essentially a part of the moveable die. The periphery of the membrane has a continuous integral seal ring 22 received in a peripheral cooperating groove 24 in the die 2. With this arrangement, a fluid under pressure preferably an inert gas such as argon, is supplied through passages 26 in the die 2 and forces the membrane securely against the surface of the article with a uniform pressure. The seal at the periphery of the membrane serves to prevent the loss of any gas and the membrane serves to avoid direct contact between the gas and the article being compacted. In the arrangement shown, the compacting gas is applied at a pressure of approximately 3,500 psi and the article is heated to a temperature of approximately 1,050°F for the bonding operation. Obviously, this pressure and temperature are applicable to the particular fiber and matrix arrangement described and will differ with other fibers and other matrices.

In operation the stops are set to limit the approach of the dies so that they are spaced apart about 0.002 inches from the correct thickness for the article. Gas, preferably argon or other inert gas, then introduced at a high pressure to press the membrane uniformly against the article. During this time the article is heated to the desired compacting and bonding temperature as above described. When a suitable time has elapsed and the article is cooled somewhat, the pressure is released, the dies are moved apart, and the completed article may be removed from the apparatus.

The conventional apparatus in which a pair of cooperating dies such as this may be positioned is well known in the art and need not be described. It is sufficient to note that suitable mechanism provides for the vertical withdrawal movement of the die 4 from the operative position shown and the return of the die to the operative position shown when an article to be compacted has been positioned on the membrane in the position shown in FIG. 1.

Figure 2:
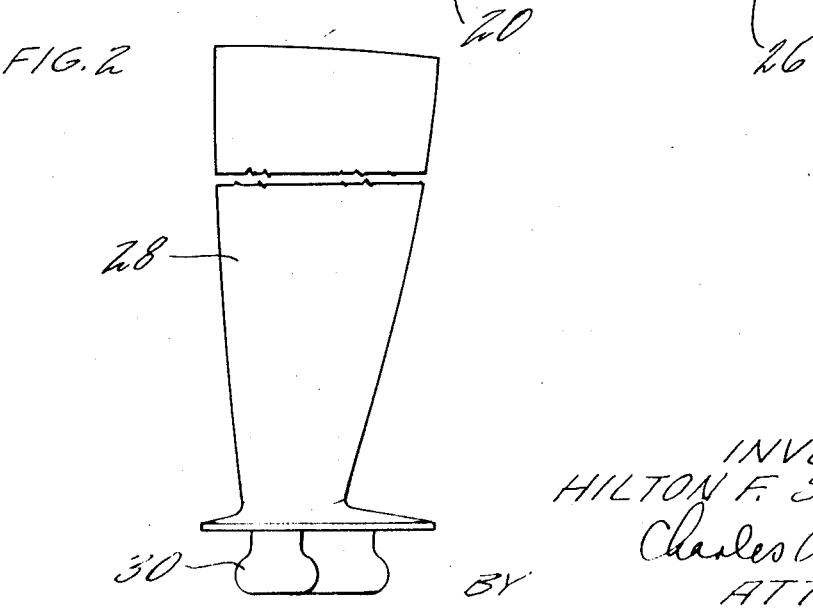
FIG. 2 is a perspective view of an article made by the apparatus.

The airfoil shaped blade, FIG. 2, is an example of the type of article that is produced by the apparatus above described. This article has an airfoil portion 28 and, at one end thereof, a root portion 30. The dies are, as above stated, shaped to establish this particular configuration for the blade during the bonding and compacting operation.

What is claimed is:

1. In a bonding die for an article having an irregular shape such as a fan blade,
    a die having a shaped surface conforming to one surface of the irregular shaped article,
    a punch cooperating with said die and having a cooperating shaped surface conforming in shape to the opposite surface of said irregularly shaped article,
    means for moving said punch and die together to define a cavity for the article and to shape the article therebetween,
    a flexible membrane overlying one of said shaped surfaces and in a position to overlay one surface of the article, and
    means for supplying a fluid under pressure in back of said membrane for exerting a uniform pressure over the entire area of the surface of the article with which the membrane engages.

2. A die as in claim 1 in which the edges of said membrane have sealing means thereon and the punch and die have cooperating surfaces for clamping said sealing means therebetween.

3. A bonding die as in claim 2 in which the membrane extends beyond the peripheries of the cooperating shaped surfaces and one of said punch or die has a groove therein spaced from the shaped surface thereon to receive said sealing means on said membrane.

4. In the manufacture of a composite airfoil such as a fan or compressor blade the steps of:
    1. laying up plies of composite tape including parallel high strength fibers in an embedding matrix, said fibers being of varying shape to accommodate the finished airfoil,
    2. positioning said laidup plies between appropriately shaped dies one for each side of the airfoil, said dies having a cavity therebetween substantially the shape of the completed airfoil,
    3. positioning a flexible membrane over one side of the assembled plies and between said plies and the dies, and
    4. applying a fluid pressure to the side of the membrane opposite to the assembled plies to provide a uniform pressure over the entire airfoil surface.

5. The method of claim 4 including the step of heating the airfoil and dies while the pressure is applied to cause the matrix to fill the spaces around the fibers to produce an article free of voids.

* * * * *